(12) United States Patent
Chen et al.

(10) Patent No.: US 6,470,463 B1
(45) Date of Patent: Oct. 22, 2002

(54) METHOD AND APPARATUS FOR TESTING INTEGRITY OF DATA TRANSFER OF A HARDWARE

(75) Inventors: Hsuan-Tung Chen; Kuang-Shin Lin, both of Taipei (TW); Yan Dong, Tianjin (CN)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/280,896

(22) Filed: Mar. 29, 1999

(51) Int. Cl.[7] ............................ G06F 11/22; G06F 13/24
(52) U.S. Cl. ............................. 714/25; 710/260; 710/52
(58) Field of Search ............................. 714/25, 34, 712; 711/168, 169; 712/244, 215, 227; 710/33, 52, 48, 260

(56) References Cited

U.S. PATENT DOCUMENTS

| 3,828,325 | A | * | 8/1974 | Stafford et al. |
| 5,666,559 | A | * | 9/1997 | Wisor et al. |
| 6,016,521 | A | * | 1/2000 | Matsubara |

* cited by examiner

*Primary Examiner*—Gopal C. Ray
(74) *Attorney, Agent, or Firm*—W. Wayne Liauh

(57) ABSTRACT

The present invention discloses a hardware data transfer integrity testing module and a hardware data transfer integrity testing method of parallel processing through the use of a ringbuffer. An interruption service program writes data into the ring buffer. When a main application program is processing the data, the interruption service program is still working to receive data, therefore saving the time for data transferring and testing. The buffer space required for the testing is also decreased.

11 Claims, 6 Drawing Sheets

METHOD AND APPARATUS FOR TESTING INTEGRITY OF DATA TRANSFER OF A HARDWARE

BACKGROUND OF THE INVENTION

The present invention relates to a method and apparatus for testing the integrity of data transfer of a hardware used in a computer, and more particularly to a method and apparatus for parallel testing the integrity of data transfer of a hardware.

The current software process of testing a hardware, such as testing a modem, a serial or parallel port, or a hardware or software driver, is first to write testing data into the hardware, wait for the response of the hardware, then process the response for comparison and analysis. In other words, the testing method of prior arts first transfers testing data to the hardware from a computer. The hardware processes the data with an application program and generates a result. Then the hardware transfers the result to the computer for recording and display. The process is shown in FIG. 1. After starting the test (step 10), data are transferred to the hardware and processed with an application program (step 11). Then the computer waits for the response data (step 12) and displays the response data (step 13). In the next step, the user can input instructions for further processing (step 14), then the computer will execute the instruction (step 15). Lastly, the computer checks if the test is finished (step 16). If not, it proceeds the test; if yes, the test is finished or another test is proceeded (step 17).

As described above, the test procedure of prior arts is a serial operation, i.e., the procedure in each step is executed one by one that a next step goes only after a prior step finishes. Therefore, it is a major disadvantage of prior arts that the serial procedure takes a longer time. For example, supposing a modem transferring data at a speed of 1 minisecond per character from a computer to an application program. The application program processes a text string at a speed of 3 miniseconds (ms) per word. Then, for a string "This is a test." of 15 characters and 4 words, the transferring time is 15 miniseconds, added with the word processing time 12 miniseconds (4 ms *3=12 ms), the toted processing time will be 27 miniseconds. (The speed of inner process for executing programing and access of data is relatively fast in nanoseconds and can be neglected.)

Furthermore, since the string processing has to be started after receiving the whole string, there should be a buffer space for at least the 15 characters. And, since it involves a serial processing, the user cannot recognize the status of processing before the program finishes its operation. If any error or failure occurs, it will waste the time and cannot be earlier noticed. When testing a modem, since the working speed of a modem varies in a wide range, for example from 110 to 11520 baud, the response time differs widely. Especially when the modem works under different speeds of CPU or display cards, the time sequence is easy to be confused. Besides that, since the data transferring has a certain possibility rate of error which will cause variance of length of the received data, the conventional data receiving, in a manner of "receiving, processing, further receiving, further processing, . . . till finishing" requires a larger buffer space for the sequential processing and causes waste of buffer space.

SUMMARY OF THE INVENTION

The primary objective of the present invention is therefore to provide a testing module for speedy hardware testing which can expedite the data flow and requires less buffer space.

The key element of the invention is to replace the traditional serial procedure with a parallel procedure for hardware testing. In prior arts, the application program starts processing only after the whole data are received. But the processing of data is actually in a manner of character by character, instead of the whole data at once. In other words, the data processing can be started with partial data. Therefore, in the present invention, during receiving testing data, the application program starts getting characters from buffer and processing the data. In this manner, the data receiving and the data processing are proceeded at the same time. Therefore, the testing time of the whole data is decreased.

The present invention utilizes a method of direct access and hardware interruption. A ring buffer is first allocated, then the data are accessed by referring to a "PUT" tag and a "TAKE" tag. An interruption service is also provided, so, during data processing of the application program, the data receiving process is also continuing.

For the application program, since the testing data need not be fully read into the buffer, the buffer memory required for the present invention is less than that of prior arts. And, since the ring buffer and the PUT and TAKE tags, the status of the ring buffer can be detected by the application program with a certain time interval. The user thus can monitor the status at anytime and avoid wasting time if a failure of the testing occurs.

The objectives and advantages oft he present invention will become apparent from a detailed description provided below, with reference to the accompanying drawings.

DETAILED DESCRIPTION OF PREFERRED EMBODIMENTS

Figure 1:
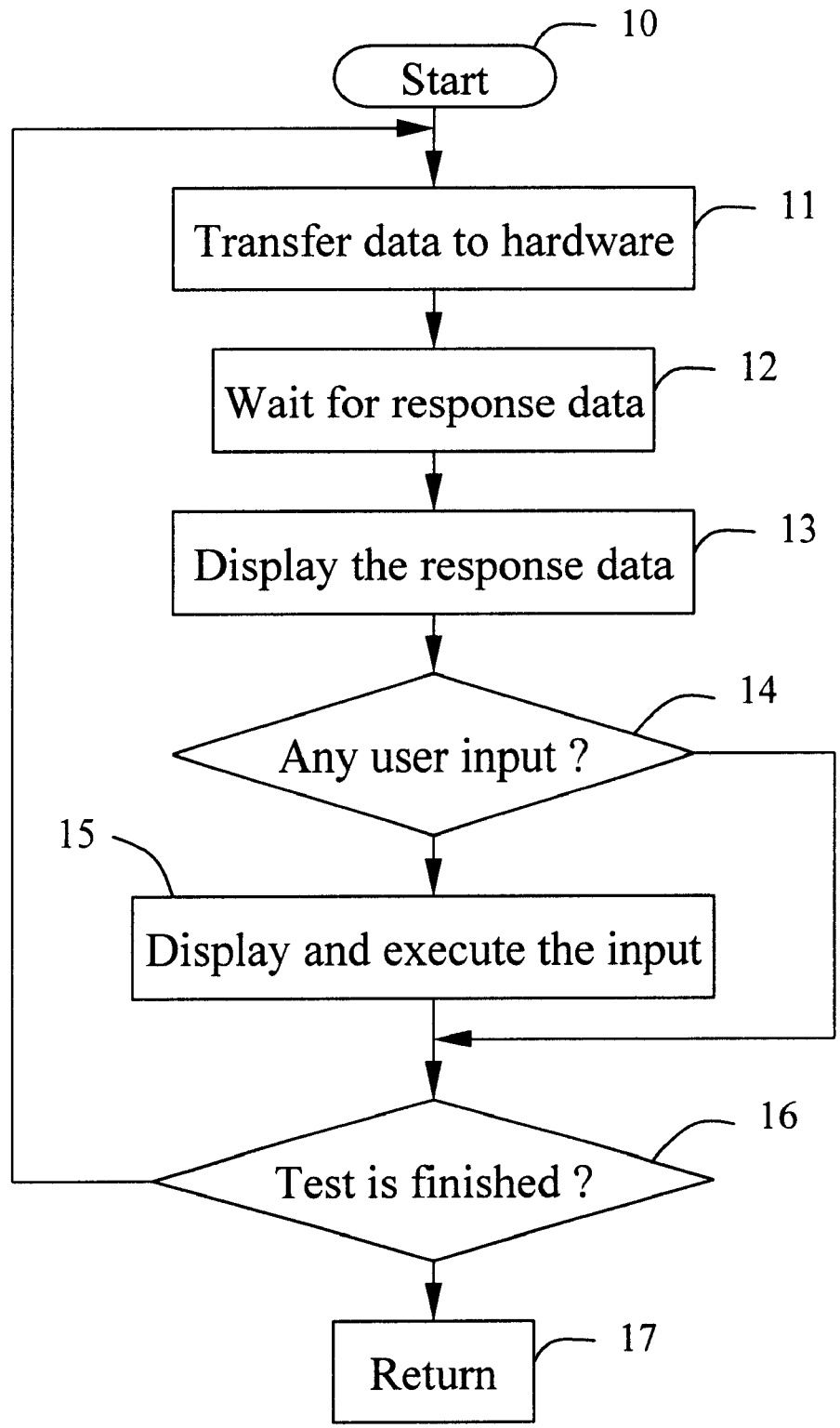
FIG. 1 is a block diagram showing a testing method of prior arts.

The testing method of prior arts has been described above with reference to FIG. 1.

Figure 2:
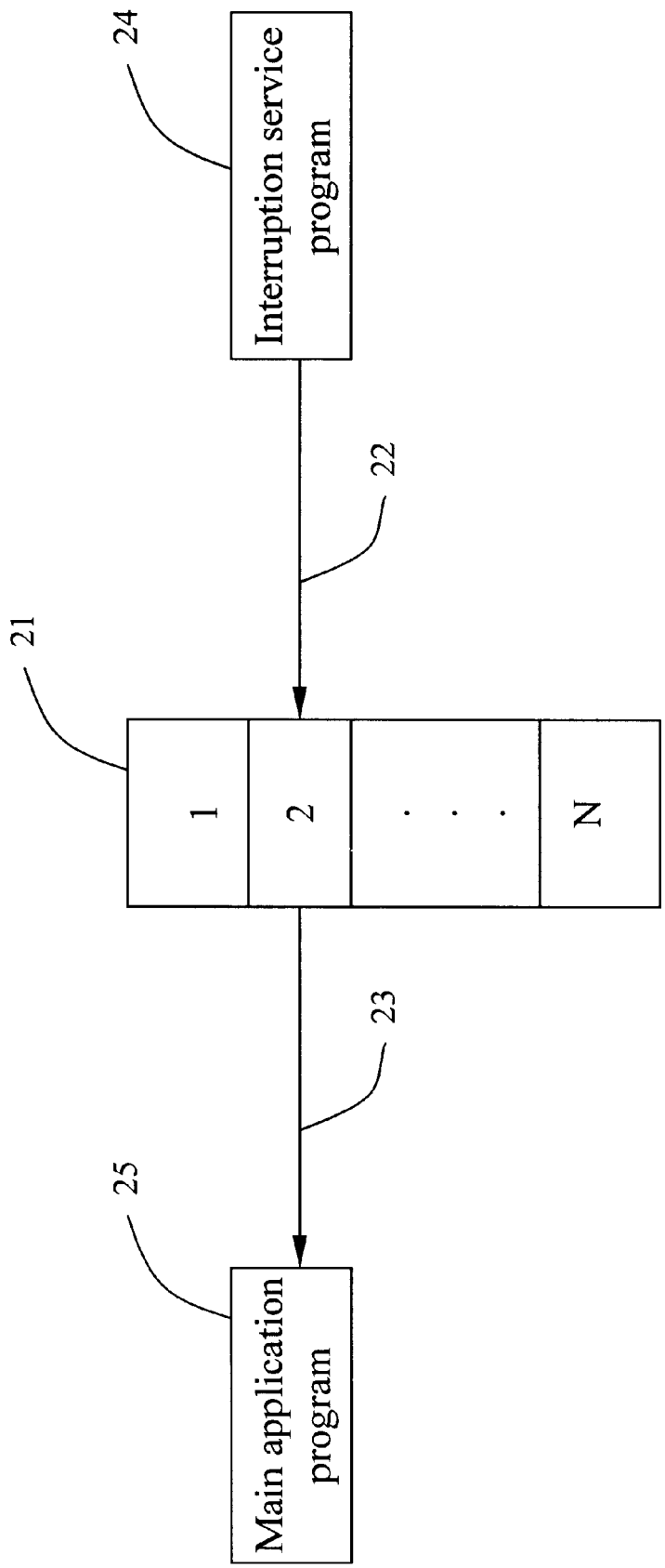
FIG. 2 is a functional block diagram of an embodiment of the present invention.

Referring now to FIG. 2, a functional block diagram of a first embodiment of the present invention is shown. There are several memory units 1 through N allocated on a ring buffer 21 .The memory unit is the minimum unit for data access. The number of bytes of the memory unit depends on the type of the hardware. A PUT tag 22 indicating a start point for data writing will be moved forward (down) along with the data writing. When the PUT tag is moved to the bottom, it will be returned to the top. A TAKE tag 23 indicating a start point for data reading will also be moved forward along with the data reading, and returned to the top when already moved to the bottom.

In the procedure of the present invention, data are transferred from a buffer of the hardware, monitored by an interruption service program 24, and written into the ring buffer 21 from a starting point indicated by the PUT tag 22. The application program 25 reads data for processing according to the TAKE tag 23. When the PUT tag or the TAKE tag exceeds the bottom of the buffer 21, it will be returned to the top point. For checking the reading status, when the TAKE tag differs from the PUT tag, there are data left for reading. For checking the writing status, when the PUT tag exceeds the TAKE tag, the ring buffer is full. By the aforesaid two checking procedures, an over-reading or over-writing can be avoided.

Figure 3:
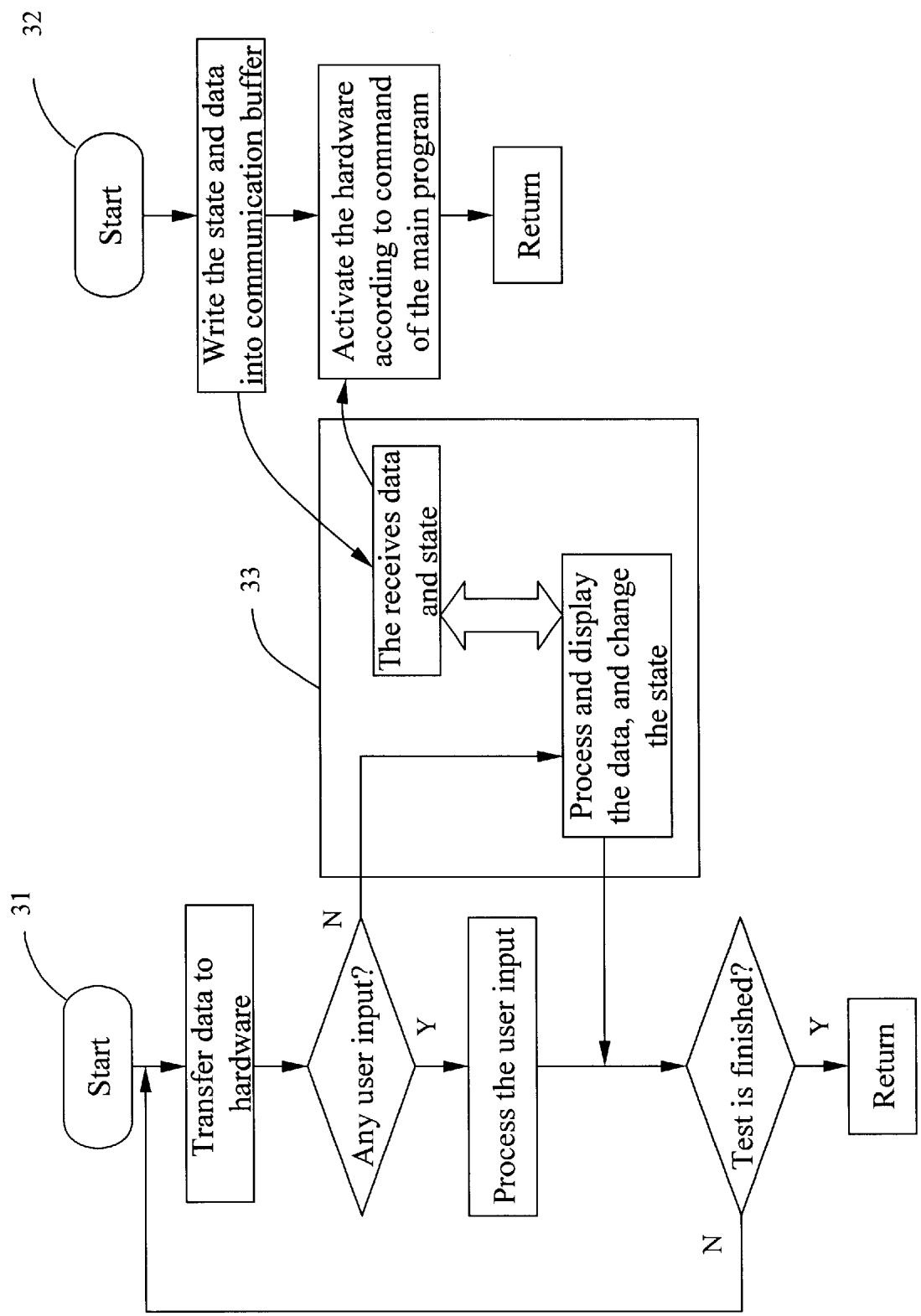
FIG. 3 is a flowchart showing the whole procedure according to the present invention.

FIG. 3 shows a flowchart of the entire procedure of the present invention. A main program 31 has charge of processing user's input, detecting the status of a communication buffer 33, executing data reading and controlling status of the hardware through controlling an interruption service program 32. The communication buffer 33 will receive the status of the hardware buffer and accept data write-in. The main program 31 and the interruption service program 32 are two parallel programs which should not concurrently access the communication buffer 33, or data will be confused. For preventing from this problem, when the main program 31 is going to use the communication buffer 33, it will first close the interruption service program 32 to stop any writing to the communication buffer 33. After the main program 31 finishing use of the communication buffer 33, the interruption service program 32 is turned on again to receive data.

Figure 4:
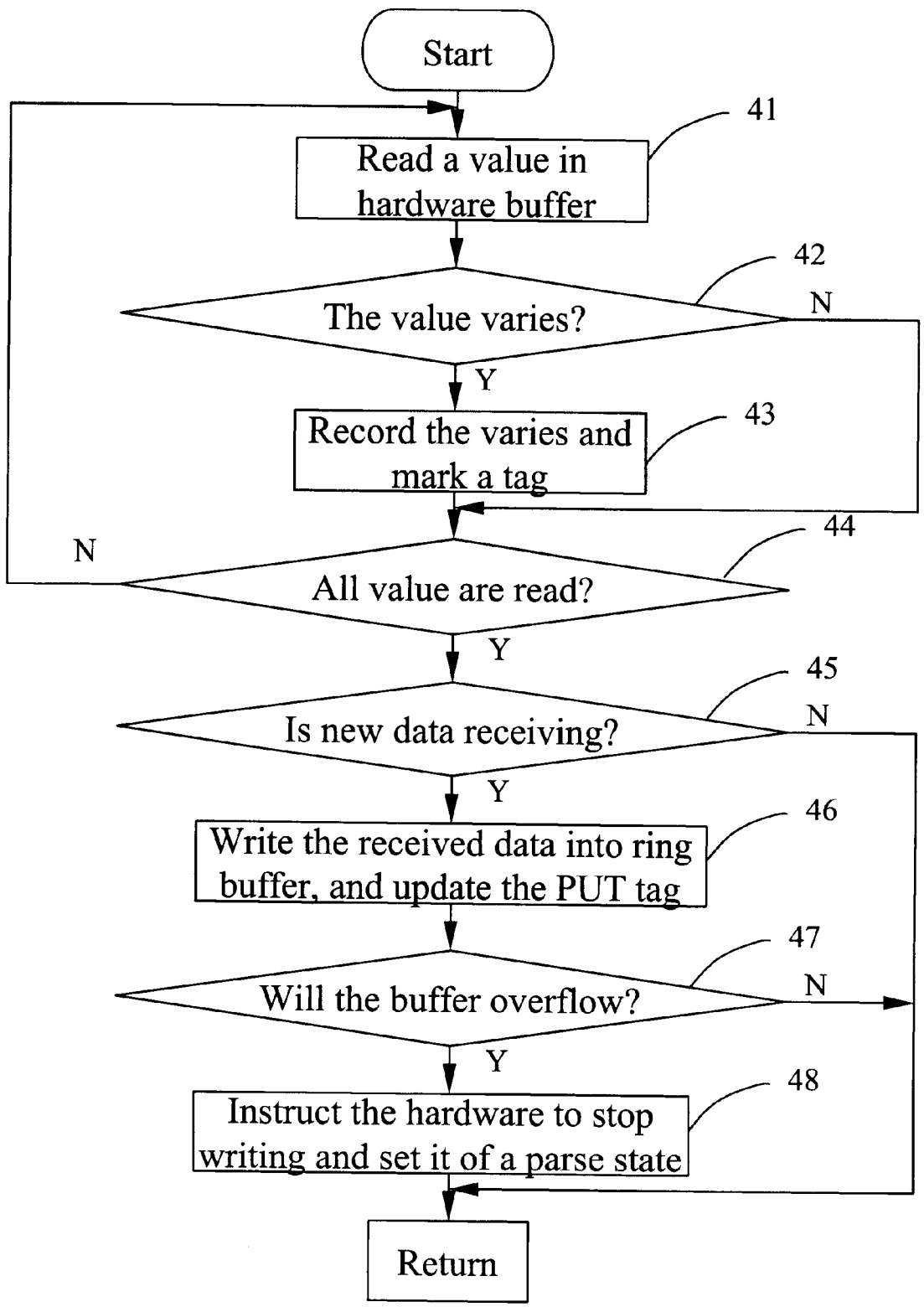
FIG. 4 is a flowchart showing an interruption service procedure.

FIG. 4 is a flowchart showing the interruption service program. The program first reads once a value of buffer unit in the hardware and checks if there are data to be transferred (step 41). Checking if the value of buffer unit varies (step 42), if yes, recording the variation and make a tag (step 43) for the main application program to identify. If not, returning to step 41 and continuing reading. If all the values are read, checking if the interruption service program is receiving new data (step 45), if yes, writing the received data into the ring buffer according to the indication of the PUT tag, and updating the PUT tag position (step 46). Then, checking if the buffer will overflow (step 47), if yes, instructing the hardware to stop writing and setting the hardware of a pause state (step 48) and returns. If the interruption service program doesn't receive any new data, then it returns directly.

Figure 5:
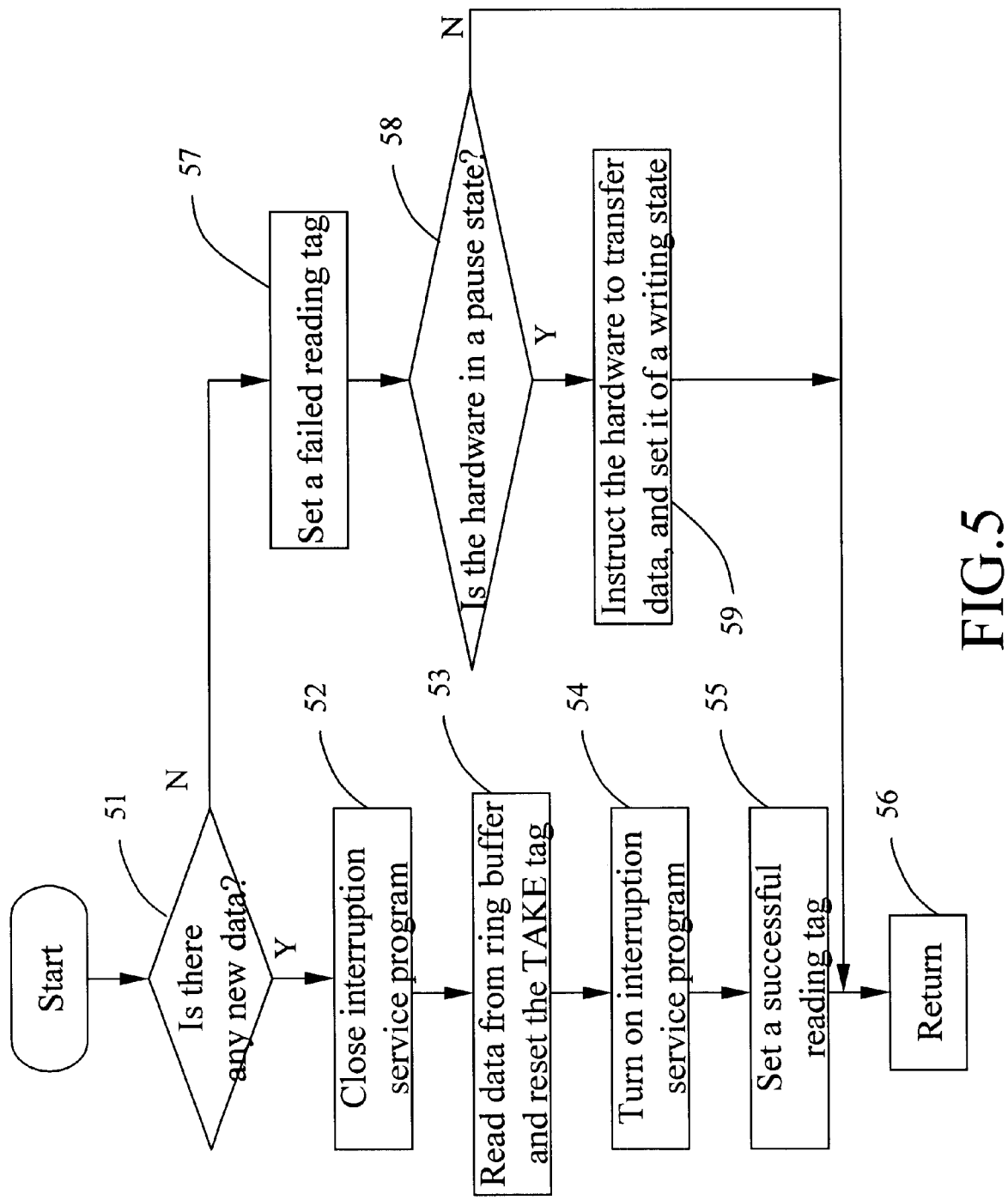
FIG. 5 is a flowchart showing data access procedure of the application program.

FIG. 5 is a flowchart showing the process of the main application program for reading data from the ring buffer. It starts from checking if there is any new data by examining the positions of PUT tag and the TAKE tag (step 51). If yes, closing the interruption service program (step 52) for avoiding new data written into the buffer during data reading of the main program, then reading data from the ring buffer, resetting the TAKE tag of the buffer after finishing reading (step 53), and turning on the interruption service program (step 54) to continue new data receiving. Then, setting a successful reading tag (step 56) and returns(step 56). If there is no new data in the ring buffer, then setting a failed reading tag (step 57) and checking if the hardware is in a pause state (step 58); if yes, instructing the hardware to transfer data, and setting the hardware of a writing state and returns; if the hardware is in a normal state, then returns directly (step 56).

Figure 6:
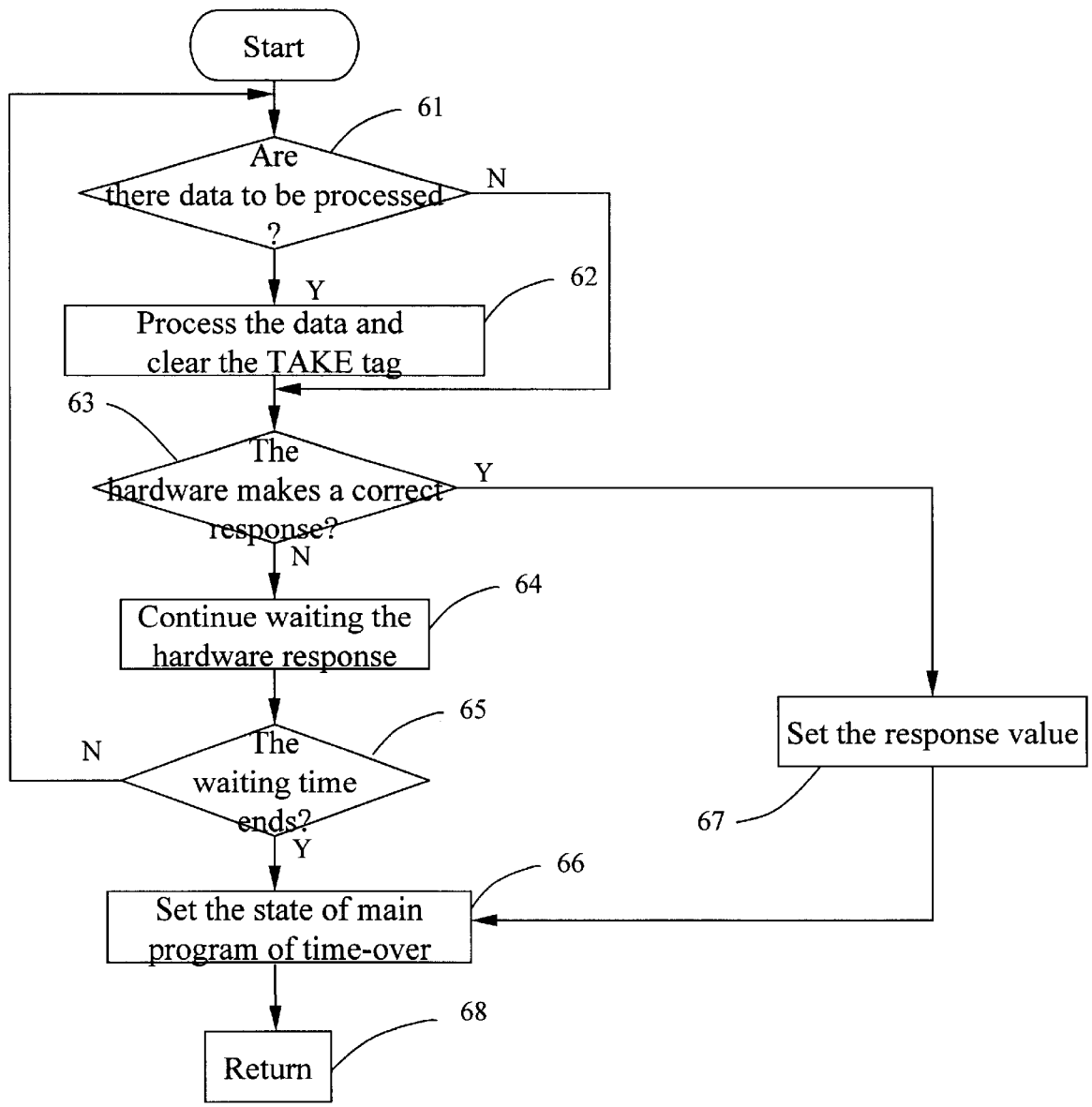
FIG. 6 is a flowchart showing a procedure of waiting and dynamic data processing.

FIG. 6 illustrates a flowchart of data access. It first checks if there are data to be processed (step 61); if yes, processing the data indicated by the new TAKE tag and clear the tag (step 62) till finishing data processing. Then checking if the hardware makes a correct response which is the same as the transferred data (step 63), if not, continuing waiting the hardware response (step 64). Checking the waiting time (step 65); if it doesn't exceed a time limit when receiving a further response of the hardware, then returning to the start point of the program and checking again if there are any now data to be processed; Otherwise, it has reached the time limit, setting the state of the main application program as time-over (step 66), and returning the process result (step 68). If the hardware makes a correct response, then setting the response value (step 67) and directly returning the result (step 68).

Still taking a modem for example. Supposing a modem transfers data at a speed of 1 minisecond per character from a computer to an application program for a text string "This is a test" of 15 characters and 4 words. Each character needs a byte of memory. The application program processes the string by words which are separated by a space or a punctuation between characters. Supposing 3 miniseconds are needed for each word. The operation speed for executing the program and data access are much faster (in the unit of nanosecond) than the processing speed, so the operation time can be omitted. Supposing the capacities of the ring buffer are 8 bytes, then the operation on the string "This is a test." is described below.

1) As shown in FIG. 6, initially, the TAKE and PUT tags are pointing to the top, i.e. the first byte, of the ring buffer;

2) The interruption service program receives the five-character data "This_" and puts them into the first till the fifth bytes of the buffer, and moves the PUT tag to the next, i.e. the sixth byte, position for the next writing. The process takes about 5 miniseconds;

3) The main application program judges that there are data to be processed by checking the position of TAKE tag differing from the position of PUT tag. Then it reads "This_" and verify it is already a word since there is a space, then moves the TAKE tag to the next, i.e. the sixth byte, position for the next reading;

4) The main application program starts processing the word "This_". It takes 3 miniseconds. During the main application program processing the word, the interruption service program is also receiving data. So, after the main application program processes the word, the word "is_" has already written into the sixth to eighth bytes of the ring buffer. Since the PUT tag has reached the bottom of the ring buffer, to prevent overflow of the buffer, the PUT tag is reset to the first byte;

5) The main application program reads "is_" and verifies it is already a word since there is a space, then it moves the TAKE tag to the first byte position;

6) The main application program starts processing the word "is_" in 3 miniseconds. Meanwhile, the interruption service program is writing "a_t" into the first to third bytes of the ring buffer, then the PUT tag is moved to the fourth byte;

7) The main application program reads "a_", and moves the TAKE tag to the third byte position;

8) The main application program starts processing the word "a_" in 3 miniseconds. Meanwhile, the interruption service program is writing "est" into the fourth to sixth bytes of the ring buffer, then the PUT tag is moved to the seventh byte;

9) "test" is read from the third byte according to the TAKE tag, and judged to be unfinished since no space is received. Therefore, the interruption service program waits for the next character;

10) The interruption service program receives the next character "." and writes it to the seventh byte in 1 minisecond, then moves the PUT tag to the eighth byte;

11) The main program receives "." and judges that it is a periodic symbol and the "test" is a finished word. Then it moves the TAKE tag to the eighth byte position;

12) Processing the word "test". It takes 3 miniseconds.

In summary, the process takes 5+3+3+3+1+3=18 miniseconds in total. It is sooner than 27 miniseconds needed for the prior art method mentioned herein earlier. And the required buffer space is also reduced from 15 bytes to 8 bytes. It is therefore apparent that the present invention enhances speed and saves buffer space.

Although the invention has been described in connection with preferred embodiments, it will be understood by those skilled in the art that various changes may be made without departing from its scope.

We claim:

1. A hardware testing module for testing integrity of a hardware, comprising:
   a hardware to be tested;
   a communication buffer for receiving and providing a status of said hardware and data transferred by said hardware;
   a main application program for detecting and reading said data written in said communication buffer and processing the same to obtain a test result; and
   an interruption service program, controlled by said main application program, for writing said data transferred by said hardware into a buffer zone of said communication buffer;
   wherein said main application program first stops said interruption service program when reading said communication buffer, and continues said interruption service program after finishing reading; and
   further wherein said main application program is structured such that said interruption service program is still writing said data into said communication buffer when said main application program is processing said data, and said data transferred by said hardware and said test result obtained from said main application program are compared to determine the integrity of said hardware.

2. A hardware testing module according to claim 1 wherein said communication buffer includes a ring buffer.

3. A hardware testing module according to claim 2 wherein said ring buffer uses a PUT tag to indicate a start point for data writing, and a TAKE tag to indicate a start point for data reading.

4. A hardware testing module according to claim 1 wherein said main application program works with a procedure including:
   checking said communication buffer and determining that there is a new portion of said data received;
   stopping said interruption service program;
   reading said new portion of data;
   continuing said interruption service program; and
   processing said new portion of data.

5. A hardware testing module according to claim 1 wherein said main application program works with a procedure including:
   checking said communication buffer and determining that there is no new portion of said data received;
   checking said hardware and ensuring that said hardware is in an idle state;
   instructing said hardware to continue transferring data; and
   setting said hardware of a transferring state.

6. A hardware testing module according to claim 1 wherein said interruption service program works with a procedure including:
   reading once a byte of data from a buffer of said hardware;
   writing said byte of data into a ring buffer of said communication buffer which includes a PUT tag; and
   updating the position of said PUT tag.

7. A method for quickly testing integrity of a hardware, comprising the following steps:
   providing a ring buffer for storing a status data of said hardware and data transferred from said hardware;
   providing a main application program for reading said status data and said transferred data
   from said ring buffer, and processing the same to obtain a test result;
   providing an interruption service program, controlled by said main application program, for writing said data transferred from said hardware into said ring buffer; and
   comparing said data transferred from said hardware and said test result obtained from said main application program to determine the integrity of said hardware;
   wherein parts of said steps are taken in a parallel manner such that during said main application program processing said data, said interruption service program is continuously writing a new portion of said data into said ring buffer.

8. A method for quickly testing a hardware according to claim 7 wherein said ring buffer uses a PUT tag to indicate a start point for data writing, and a TAKE tag to indicate a start point for data reading.

9. A method for quickly testing a hardware according to claim 7, wherein said main application program operates according to a procedure including the following steps:
   checking said ring buffer and determining that there is a new data stored therein:
   stopping said interruption service program;
   reading a new portion of data,
   continuing said interruption service program; and
   processing said new portion of data.

10. A method for quickly testing a hardware according to claim 7, wherein said main application program operates according to a procedure including the following steps:
    checking said ring buffer and determining that there is a new data stored therein;
    checking said hardware and ensuring that said hardware is in an idle state,
    instructing said hardware to continue transferring data, and
    setting said hardware to a transferring state.

11. A method for quickly testing a hardware according to claim 7 wherein said interruption service program operates according to a procedure including the following steps:
    reading once a byte of data from a buffer of said hardware;
    writing said byte of data into said ring buffer of said communication buffer which includes a PUT tag; and
    updating the position of said PUT tag.

* * * * *